Nov. 27, 1951

W. G. MARTIN 2,576,620

SILO UNLOADING DEVICE WITH MEANS TO DISLODGE
SILAGE FOR READY DISCHARGE

Filed Oct. 2, 1946

INVENTOR.
Wesley G. Martin
BY
Elvin C. Andrus
Attorney

Patented Nov. 27, 1951

2,576,620

UNITED STATES PATENT OFFICE 2,576,620

SILO UNLOADING DEVICE WITH MEANS TO DISLODGE SILAGE FOR READY DISCHARGE

Wesley G. Martin, Milwaukee, Wis., assignor to A. O. Smith Corporation, Milwaukee, Wis., a corporation of New York Application October 2, 1946, Serial No. 700,697

6 Claims. (Cl. 222—228)

This invention relates to an unloading device for silos and the like and has particular relation to a device that is employed in a substantially airtight silo to dislodge the silage for removal from the bottom of the silo without any substantial amount of air gaining access to the silo.

With ordinary devices for removing silage from the bottom of a silo, the silage tends to remain stacked in a substantially solid column within the silo and only the silage initially at the bottom of the silo can readily be removed. The operator then must wait until the silage mass moves downwardly before removal of the silage in any great amounts can again take place.

It has particularly been found difficult to remove silage from the bottom of silos during below freezing temperature when the silage tends to freeze together and to the walls of the silo, preventing downward movement thereof.

The invention is directed to a device that extends within the column of silage substantially from the bottom to the top of the silo and which is rotated inside the silage column to loosen the silage for settling to the bottom of the silo under its own weight.

One object of the invention is to provide a device for unloading silos and the like from the bottom that overcomes the problems of bridging and cavitation and freezing or adherence of the silage to the silo wall.

Another object is to provide an unloading device which operates on substantially the entire column of silage stored in the silo to dislodge the same for ready removal from the bottom of the silo.

A further object is to provide an unloading device which removes silage in cold weather when the silage tends to freeze together and to the silo wall.

These and other objects of the invention will appear hereinafter in connection with the following description of an embodiment of the invention as illustrated in the accompanying drawings.

Figure 1:
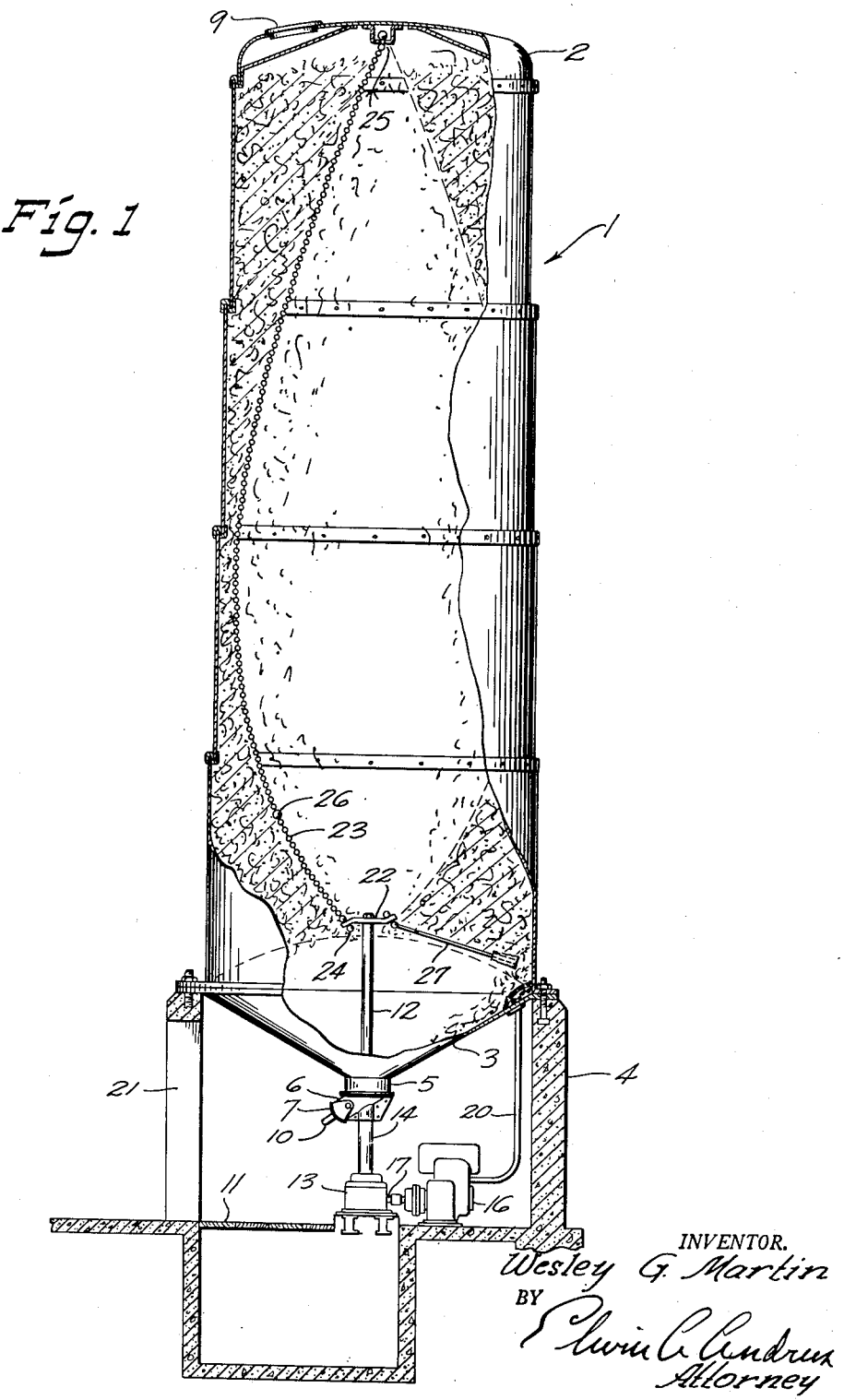
Figure 1 is a longitudinal sectional view of the device in operation within a silo.
Figure 2:
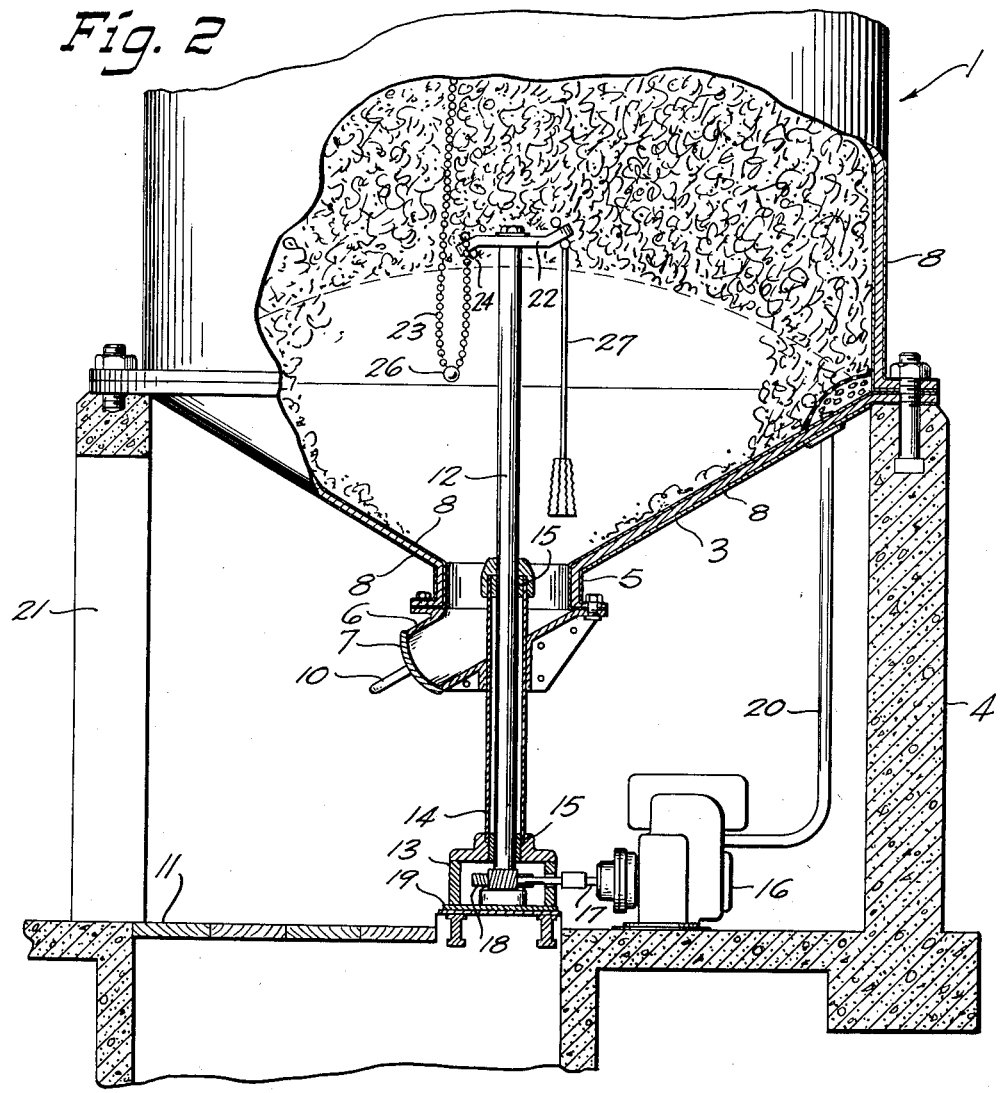
Fig. 2 is an enlarged view of the lower portion of the chain showing swiveling connections therein and the chain hanging loose.
Figure 3:
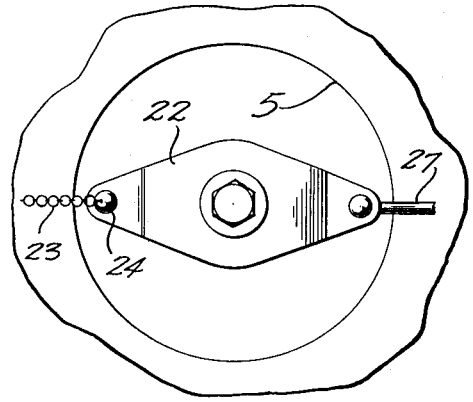
Fig. 3 is a top plan view of the crank.

The drawings illustrate a silo comprising the shell 1 having a cover section 2 and a cone bottom 3 with the shell and cone 3 bolted or otherwise secured to the foundation 4 of cement or the like. The cone 3 has a central neck 5 from which extends a chute 6 normally closed by the airtight door 7, and through which flows the silage unloaded from the bottom of the silo. The shell 1, cover 2 and cone bottom 3 as well as other exposed metal parts of the silo are coated with ceramic enamel 8 to protect the same from corrosion in service.

The silo is provided at the upper end with the opening 9 for loading of the silo with fodder. After filling of the silo, opening 9 is sealed to prevent entry of air.

Chute 6 is closed against the entry of air, except during unloading, by the door 7 which is hinged thereto and provided with a handle 10 for opening and closing by the operator standing on floor 11 of foundation 4.

The driving portion of the unloading agitator of the invention has a vertical shaft 12 which extends centrally upwardly through chute 6 and neck 5 to a line substantially within the bottom of the silo and above the normal bridging zone of the silage mass as indicated by dotted lines in the drawings. The lower end of shaft 12 is disposed within gear box 13 which is supported on the floor 11 of the foundation. Shaft 12 is supported for rotation within bearing sleeve 14 which extends from gear box 13 upwardly through chute 6. The shaft rotates within bushings 15 disposed at the upper and lower ends of sleeve 14.

The gasoline engine 16 is supported on floor 11 to one side of gear box 13. The drive shaft 17 of motor 16 extends into gear box 13 and drives agitator shaft 12 through the gears 18. The bearing plate 19 supports the assembly within gear box 13.

The exhaust gases from engine 16 are conveyed to the inside of the silo by pipe 20 which extends from the engine through the cone bottom 3 or which may extend to the top of the silo. These gases purge oxygen from the silo that may enter when chute 6 is open, as disclosed and claimed in the co-pending application of the present inventor entitled Silo, filed June 7, 1945, Serial No. 598,044, now Patent No. 2,551,216, and assigned to the same assignee as the present invention.

The floor 11 of foundation 4 is constructed so that a portion thereof may be removed should it be necessary to lower agitator shaft 12 into the pit of the foundation for repairs and to facilitate assembly of the shaft within the silo.

The opening 21 is provided in foundation 4 for access therein by the operator for removal of silage falling from chute 6 or to perform other necessary tasks therein.

The upper end of the agitator shaft 12 is provided with the swivel plate 22 which functions as a crank as will be described.

The chain 23 is pivoted to the swivel 24 which is secured to the outer portion of plate 22 and the chain extends upwardly to cover section 2 of the silo and is secured centrally to the latter by swivel 25. The cover may be braced by suitable beams so it will not collapse in service. The upper swivel connection 25 is on the same axial line of rotation as shaft 12 and the pivoting of the chain to the outer portion of plate 22 offsets the upper and lower ends of the chain for effective catenary operation of the chain.

The upper swivel 25 may be directly secured to the top of the silo as shown or may be supported in any suitable way such as by a plurality of beams extending transversely of the silo near the top.

Chain 23 also has a swivel 26 slightly removed from swivel 24 which joins the chain to plate 22. The chain is ordinarily slack in this area and the swivels 24 and 26 prevent the chain from winding upon itself in operation.

Chain 23 is generally heavy and is of a length to just clear the wall of the silo when it is swerved outwardly in a catenary arc under centrifugal force.

Centrifugal movement is imparted to chain 23 by engine 16 rotating shaft 12 to revolve the swivel plate 22 to which chain 23 is attached.

The offset of the lower end of chain 23 from the upper end, as described, is extremely effective in developing or imparting catenary movement to chain 23 which is important in the effective dislodgement of silage.

In order to additionally insure that chain 23 will not become stalled against centrifugal movement in operation, a number of the swivels 26 may be employed at spaced intervals throughout the length of the chain.

The swivel plate 22 may also be provided with the flexible arm member 27 which swings outwardly when shaft 12 rotates. Arm member 27 is secured at the inner end to plate 22 opposite the chain swivel 24 and the arm is of a length to clear the wall of the silo as it is swung outwardly upon rotation. Arm 27 aids in directing the silage dislodge by chain 23 downwardly and out of chute 6 and revolves along with chain 23. Arm 27 might also be secured to chain 23 itself slightly above plate 22 to additionally force the lower portion of the chain to swing outwardly under centrifugal force when plate 22 is rotated, and at the same time operate as a dislodging member.

In the removal of silage from a silo in which the invention is employed, chute 6 is first opened by swinging door 7 away from the end thereof. Engine 16 is started to rotate shaft 12. Rotation of shaft 12 swings arm 27 outwardly to loosen up silage within cone bottom 3 for discharge through chute 6. At the same time chain 23 is swung outwardly under centrifugal force imparted to it by rotation of plate 22 on the upper end of shaft 12.

After the silage in the bottom of the silo is removed, the silage tends to bridge over within a zone above cone bottom 3 as indicated by the dotted lines in the drawings. The silage in the bridging zone may not be accessible to the arm 27.

Chain 23, however, cuts a generally central hole through the mass of silage above the bridging zone, under agitation by shaft 12 and plate 22. The dislodged silage falls down through the hole to the bottom of the silo. The hole through the silage is gradually enlarged from the bottom upwardly by chain 23 until the silage is cut through to substantially the wall of the silo. Engine 16 may be run as described in the copending application referred to previously to supply combustion gases to the inside of the silo through pipe 20.

The device of the invention provides an effective unloading agitator which operates substantially the length of the silo to remove silage. The device eliminates the problem of removing silage above the bridging zone by an agitator which only operates in the bottom of the silo. The bridging ordinarily occurs before any substantial amounts of silage are removed.

The silage mass tends to gradually move down into the bridging zone so that new layers are constantly being built up in the zone. This movement is relatively slow, however, and in winter temperatures the movement may be restricted for days due to the freezing of the silage mass together and to the walls of the silo. The device of the invention, however, operates on the silage above the bridging zone to remove the same at any time regardless of freezing conditions or slow movement of the silage mass downwardly.

The chain agitator does not restrict the silo capacity nor require other support than at both ends. The swivels at each end of the chain and in the chain itself, as well as the offset of the chain from the axis of the agitator shaft insure that the chain will always remain subject to centrifugal action that will provide the chain as a working member throughout substantially the length thereof and in any part of its length without binding or stalling.

Various embodiments of the invention may be employed within the scope of the accompanying claims.

I claim:

1. A device for unloading silage from a silo and the like, which comprises a flexible member extending centrally from substantially the bottom to the top of the silo, pivotal means anchoring said member to the bottom and the upper portion of the silo with the bottom pivotal means offset laterally from the pivotal means anchoring the member to the upper portion of the silo, and means to rotate said flexible member to force the same into a catenary movement within the silo to dislodge silage, with said pivotal offset of the chain developing the catenary movement thereof irrespective of the packed condition of the silage.

2. A device for unloading silage from a silo and the like, which comprises a vertical drive shaft extending centrally through the bottom of the silo and upwardly therein for a substantial distance, a flexible member extending longitudinally substantially the length of the silo with the upper end pivotally connected to the upper portion of the silo and the lower end pivotally connected to said shaft and offset laterally from the upper end of the member and from said shaft, and means to rotate said shaft to impart centrifugal movement to said flexible member and swing the same outwardly in a catenary for dislodgement of silage with said offset of the lower end of the chain developing the catenary movement thereof irrespective of the packed condition of the silage.

3. A device for unloading silage from a silo and the like, which comprises a vertical drive shaft extending centrally through the bottom of the silo and upwardly therein for a substantial distance, a swivel plate secured to the upper end of said shaft, a generally slack flexible member extending longitudinally substantially the length of the silo with the upper end pivotally connected to the upper portion of the silo and the lower end pivotally connected to the outer circumference of said swivel plate to offset the same from the upper end thereof, and means to rotate said shaft and plate to impart centrifugal movement to said flexible member and swing the same outwardly in a catenary for dislodgement of silage, with said offset of the lower end of the member developing the catenary movement thereof irrespective of the packed condition of the silage.

4. A device for unloading silage from a silo and the like, which comprises a generally slack flexible member extending centrally from substantially the bottom to the top of the silo, pivotal means connecting said member to the bottom and the upper portion of the silo with the bottom pivotal means laterally offset from the top pivotal means, at least one swivel disposed in the lower portion of said flexible member to prevent binding of the member in service, and means to rotate said flexible member to force the same into a catenary movement within the silo to dislodge silage, with said pivotal offset of the member developing the catenary movement thereof irrespective of the packed condition of the silage.

5. A device for unloading silage from a silo and the like, which comprises a vertical drive shaft extending centrally through the bottom of the silo and upwardly therein for a substantial distance, a swivel plate secured to the upper end of said shaft, a generally slack flexible member extending longitudinally substantially the length of the silo with the upper end pivotally connected to the upper portion of the silo and the lower end pivotally connected to the outer circumference of said swivel plate to offset the same from the upper end thereof, at least one swivel disposed in the lower portion of said flexible member to prevent binding of the member in service, and means to rotate said shaft to impart centrifugal movement to said flexible member and swing the same outwardly in a catenary for dislodgement of silage, with said offset of the lower end of the member developing the catenary movement thereof irrespective of the packed condition of the silage.

6. A device for unloading silage from a silo and the like, which comprises a vertical drive shaft extending centrally through the bottom of the silo and upwardly therein for a substatnial distance, a swivel plate secured to the upper end of said shaft, a generally slack flexible member extending longitudinally substantially the length of the silo with the upper end pivotally connected to the upper portion of the silo and the lower end pivotally connected to the outer circumference of said swivel plate to offset the same from the upper end thereof, a flexible arm member pivoted to said plate at a location substantially opposite to the pivotal connection of said flexible member and of a length to clear the silo wall when swung outwardly, and means to rotate said shaft and plate to impart centrifugal movement to said flexible members to swing the same outwardly for dislodgement of silage.

WESLEY G. MARTIN.

REFERENCES CITED

The following references are of record in the file of this patent:

UNITED STATES PATENTS

| Number | Name | Date |
|---|---|---|
| 273,755 | Miller | Mar. 13, 1883 |
| 1,063,420 | Crawford | June 3, 1913 |
| 2,228,421 | Taylor | Jan. 14, 1941 |